United States Patent
Lind et al.

(10) Patent No.: US 11,718,292 B2
(45) Date of Patent: Aug. 8, 2023

(54) VEHICLE SURFACE IMPACT DETECTION

(71) Applicant: GM Cruise Holdings LLC, San Francisco, CA (US)

(72) Inventors: Amanda Lind, Brooklyn, NY (US); Gabriel Andrew Rodriguez, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 17/114,167

(22) Filed: Dec. 7, 2020

(65) Prior Publication Data

US 2022/0144258 A1  May 12, 2022

Related U.S. Application Data

(63) Continuation-in-part of application No. 17/095,835, filed on Nov. 12, 2020.

(51) Int. Cl.
*B60W 30/095* (2012.01)
*G01P 15/093* (2006.01)
*B60W 60/00* (2020.01)

(52) U.S. Cl.
CPC .... *B60W 30/0953* (2013.01); *B60W 60/0015* (2020.02); *G01P 15/093* (2013.01); *B60W 2420/10* (2013.01); *B60W 2422/90* (2013.01)

(58) Field of Classification Search
CPC ......... B60W 2420/10; B60W 2422/90; B60W 30/0953; B60W 60/0015; B60W 2550/00; B60W 2550/10; B60W 2550/14; B60W 2550/20; B60W 2550/22; B60W 2550/30; B60W 2550/40; B60W 2550/402; B60W 2400/00; B60W 2420/00; B60W 2420/40; B60W 2420/403; B60W 2420/42; B60W 2420/52; B60W 2420/62; B60W 2420/905; B60W 2422/00; B60W 2422/95; B60W 30/095; B60W 60/00; G01P 15/093;
(Continued)

(56) References Cited

U.S. PATENT DOCUMENTS 6,072,388 A    6/2000  Kyrtsos
6,151,539 A *  11/2000 Bergholz ............ B60W 30/186
                                                701/472
(Continued)

FOREIGN PATENT DOCUMENTS

CN    103231693 A      8/2013
EP    1743819 B1  *   9/2009  ............ B60T 8/172

OTHER PUBLICATIONS

Bosch, R., "Pressure Tube Sensor," Bosch Mobility Solutions; 6 pages (2020).
(Continued)

*Primary Examiner* — Anthony R Jimenez
(74) *Attorney, Agent, or Firm* — Akona IP

(57) ABSTRACT

Systems and methods are provided for using sensors and signal processing to detect vehicle surface impacts. In particular, a sensor and signal processing approach is provided for detecting impacts, with the results having a low false positive rate. The approach reduces operator costs by reducing operator involvement through improved automated detection technology. Additionally, systems and methods are provided for distinguishing chassis-driven fascia vibration from impact-driven fascia vibration.

19 Claims, 14 Drawing Sheets

(58) Field of Classification Search
CPC .......... G01P 15/00; G01P 15/02; G01P 15/03; G01P 15/097; G01P 15/14; G01P 15/16; G01P 15/165; G01P 15/18; G01H 17/00; G01H 11/00; G01H 9/00; B60R 2300/00; B60R 2300/102; B60R 2300/103; B60R 2300/105; B60R 2300/30; B60R 2300/301; B60R 2300/302; B60R 2300/80; B60R 2300/804; B60R 2300/8086; B60R 1/00
USPC .......................................................... 701/23
See application file for complete search history.

(56) References Cited

U.S. PATENT DOCUMENTS

| | | | | |
|---|---|---|---|---|
| 7,138,938 | B1* | 11/2006 | Prakah-Asante | G01S 15/931 342/70 |
| 7,487,059 | B2 | 2/2009 | Davis et al. | |
| 7,650,210 | B2* | 1/2010 | Breed | G07C 5/008 701/31.9 |
| 7,844,378 | B2* | 11/2010 | Lange | A01B 15/20 701/50 |
| 8,036,788 | B2* | 10/2011 | Breed | G07C 5/008 701/31.9 |
| 9,020,690 | B2* | 4/2015 | McKown | H04W 4/90 701/33.7 |
| 9,349,225 | B2* | 5/2016 | Wanami | G07C 5/008 |
| 10,093,435 | B2 | 10/2018 | Silva et al. | |
| 2005/0038580 | A1 | 2/2005 | Seim et al. | |
| 2005/0125117 | A1 | 6/2005 | Breed | |
| 2008/0040004 | A1* | 2/2008 | Breed | G01S 7/023 701/45 |
| 2013/0021138 | A1 | 1/2013 | Ezzat et al. | |
| 2014/0324275 | A1 | 10/2014 | Stanek et al. | |
| 2019/0225233 | A1 | 7/2019 | Tod et al. | |
| 2022/0146456 | A1 | 5/2022 | Brandon et al. | |

OTHER PUBLICATIONS

U.S. Appl. No. 17/735,661 entitled "Touch and Collision Transducer Sensor Simulation Using Matrix Lookup Table and Signal Generation," filed May 3, 2022; 50 pages.

* cited by examiner

VEHICLE SURFACE IMPACT DETECTION

CROSS-REFERENCE TO RELATED APPLICATION

This Application is a continuation-in-part of and claims priority to U.S. application Ser. No. 17/095,835 filed Nov. 12, 2020, and titled "Transducer-based Structural Health Monitoring of Autonomous Vehicles", which Application is incorporated herein by reference into the disclosure of this Application.

FIELD OF THE DISCLOSURE

The present disclosure relates generally to vehicle surface impact detection and to systems and methods for using sensors and signal processing to detect vehicle surface impacts.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Autonomous vehicles are often used in rideshare services and spend many hours per day on the road. While driving on public roadways, it is possible that an autonomous vehicle may collide with an object, vehicle, or person. Additionally, pedestrians, bicyclists, skateboarders, and others may graze by or otherwise touch the autonomous vehicle. Some jurisdictions require autonomous vehicles to record audio and video for a period of time surrounding all types of collisions.

SUMMARY

Systems and methods are provided for using sensors and signal processing to detect vehicle surface impacts. In particular, a sensor and signal processing approach is provided for detecting impacts, with the results having a low false positive rate. The approach reduces operator costs since improved automated detection technology reduces operator involvement. Additionally, systems and methods are provided for distinguishing chassis-driven fascia vibration from impact-driven vibration.

According to one aspect, a system for monitoring detecting an impact on a vehicle comprises a plurality of transducers positioned on an interior side of a vehicle surface configured to generate transducer data, a data acquisition module configured to receive the transducer data from the plurality of transducers and generate combined transducer data, and a signal processor configured to process the combined transducer data and identify outlier data.

In some implementations, the system further includes an impact detection module configured to receive the combined transducer data and the outlier data, and further configured to detect the impact on the vehicle based, at least in part, on the combined transducer data and the outlier data.

According to another aspect, an autonomous vehicle having an impact detection system comprises a plurality of transducers positioned on an interior side of a vehicle surface configured to generate transducer data, and an onboard computing system configured to receive the transducer data from the plurality of transducers, comprising a data acquisition module configured to generate combined transducer data, and a signal processor configured to process the combined transducer data and identify outlier data.

According to some implementations, the onboard computing system further comprises an impact detection module configured to receive the combined transducer data and the outlier data, and further configured to make an impact detection determination based, at least in part, on the combined transducer data and the outlier data.

According to another aspect, a method for detecting impacts to a vehicle comprises receiving transducer data from a plurality of transducers on a vehicle fascia; filtering the transducer data to reduce noise; evaluating the transducer data to detect impacts; and, upon impact detection, initiating an impact detection protocol.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Systems and methods are provided for using sensors and signal processing to detect vehicle surface impacts. In particular, a sensor and signal processing approach is provided for detecting impacts, with the results having a low false positive rate. The approach reduces operator costs by reducing operator involvement through improved automated detection technology. Additionally, systems and methods are provided for distinguishing chassis-driven fascia vibration from impact-driven fascia vibration.

Some impact detection systems rely on camera and LIDAR data, and have relatively high false positive rates. Upon detection of an impact, a remote-assist protocol (involving a remote live operator) is activated. With many vehicles in a fleet, these systems can include a high level of human involvement and become very expensive. Less expensive and more accurate systems are needed for detecting and identifying vehicle surface impacts.

Many different types of impacts and collisions can occur while an autonomous vehicle is driving around. For example, a bicyclist, pedestrian, skateboarder, rollerblader, scooter-driver, or other person may move close to a vehicle and touch an exterior of the vehicle. Additionally, an autonomous vehicle can be rear-ended or side-swiped by another vehicle. Furthermore, an object from the road can hit the autonomous vehicle, such as road debris propelled by another vehicle, and/or something can fall onto the vehicle such as an acorn or branch. In some examples, an object on the road (such as a plastic bag or tree branch) can become attached to the vehicle, resulting in the vehicle dragging the object around as it drives.

Systems and methods are provided for integrating specialized surface transducers on an interior surface of an outer vehicle shell, and using surface transducer data to detect surface impacts. The surface transducer data can be used to determine the location of surface impacts. Additionally, in various examples, data from inertial sensors on an interior vehicle frame is used in combination with the surface transducers to determine whether outlier surface transducer data is a result of chassis motion (such as a speed bump) or if outlier surface transducer data is generated by a source surface impact.

In various implementations, surface transducers include one or more of a multi-access accelerometer and/or microphone. Measurements from the multi-access accelerometer and/or microphone in multiple transducers are used to identify collisions with the vehicle. In various implementations, the transducers are installed on the vehicle and the transducer signals are continuously monitored.

Example Autonomous Vehicle Configured for Collision Detection

Figure 1:
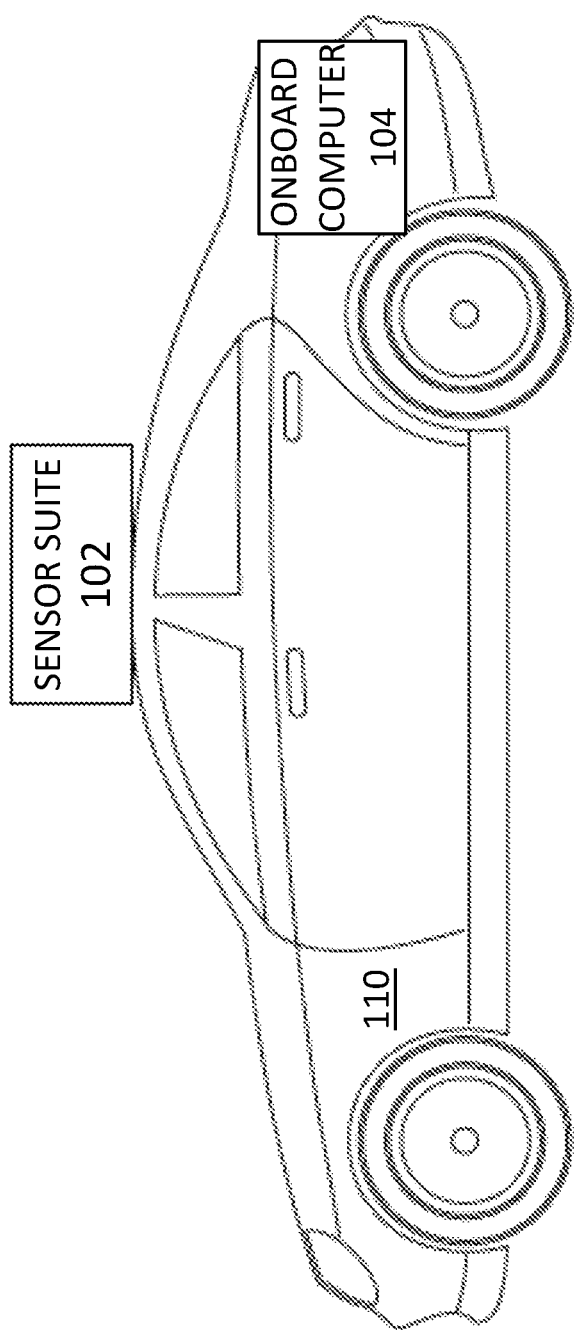
FIG. 1 is a diagram illustrating an autonomous vehicle, according to some embodiments of the disclosure.

FIG. 1 is a diagram 100 illustrating an autonomous vehicle 110, according to some embodiments of the disclosure. The autonomous vehicle 110 includes a sensor suite 102 and an onboard computer 104. In various implementations, the autonomous vehicle 110 uses sensor information from the sensor suite 102 to determine its location, to navigate traffic, and to sense and avoid obstacles. In various examples, the autonomous vehicle 110 includes multiple integrated surface transducers for detecting impacts and collisions. According to various implementations, the autonomous vehicle 110 is part of a fleet of vehicles for picking up passengers and/or packages and driving to selected destinations.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system. The sensor suite 102 continuously monitors the autonomous vehicle's environment and, in some examples, sensor suite 102 data is used to detect selected events, and update a high fidelity map. In particular, data from the sensor suite can be used to update a map with information used to develop layers with waypoints identifying selected events, the locations of the encountered events, and the frequency with which the events are encountered at the identified location. In some examples, the events includes road hazard data such as locations of pot holes or debris. In this way, sensor suite 102 data from many autonomous vehicles can continually provide feedback to the mapping system and the high fidelity map can be updated as more and more information is gathered.

The sensor suite 102 includes a plurality of sensors and is coupled to the onboard computer 104. In some examples, the onboard computer 104 receives data captured by the sensor suite 102 and utilizes the data received from the sensor suite 102 in controlling operation of the autonomous vehicle 110. In some examples, the onboard computer 104 combines data received from the sensor suite 102 with data received from multiple surface sensors to detect surface impacts and collisions. In some examples, one or more sensors in the sensor suite 102 are coupled to the vehicle batteries, and capture information regarding a state of charge of the batteries and/or a state of health of the batteries.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view. In some examples, the sensor suite 102 records information relevant to vehicle structural health. In various examples, additional sensors are positioned within the vehicle, and on other surfaces on the vehicle. In some examples, additional sensors are positioned on the vehicle chassis.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. In some examples, the autonomous vehicle 110 includes one or more cameras inside the vehicle. The cameras can be used to detect items or people inside the vehicle. In some examples, the autonomous vehicle 110 includes one or more weight sensors inside the vehicle, which can be used to detect items or people inside the vehicle. Based upon the vehicle state and programmed instructions, the onboard computer 104 controls and/or modifies driving behavior of the autonomous vehicle 110.

In some implementations, the onboard computer 104 receives indications of the state of charge and/or state of health of the batteries and determines operations to be performed by the autonomous vehicle 110 based on the state of the batteries. For example, the onboard computer 110 may determine the level of charge of the batteries, and the onboard computer 110 may determine that the batteries need to be charged. In some implementations, based on a determined state of charge and/or state of health of the batteries, the onboard computer may perform operations to address a condition of the batteries, such as causing the vehicle to proceed to a charging station for charging the batteries and causing charging of the batteries to be stopped in response to determining the batteries have been charged to a selected level of charge.

The onboard computer 104 functions to control the operations and functionality of the autonomous vehicle 110 and processes sensed data from the sensor suite 102 and/or other sensors in order to determine states of the autonomous vehicle. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system 100 of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Vehicle Front View with Transducers

Figure 2:
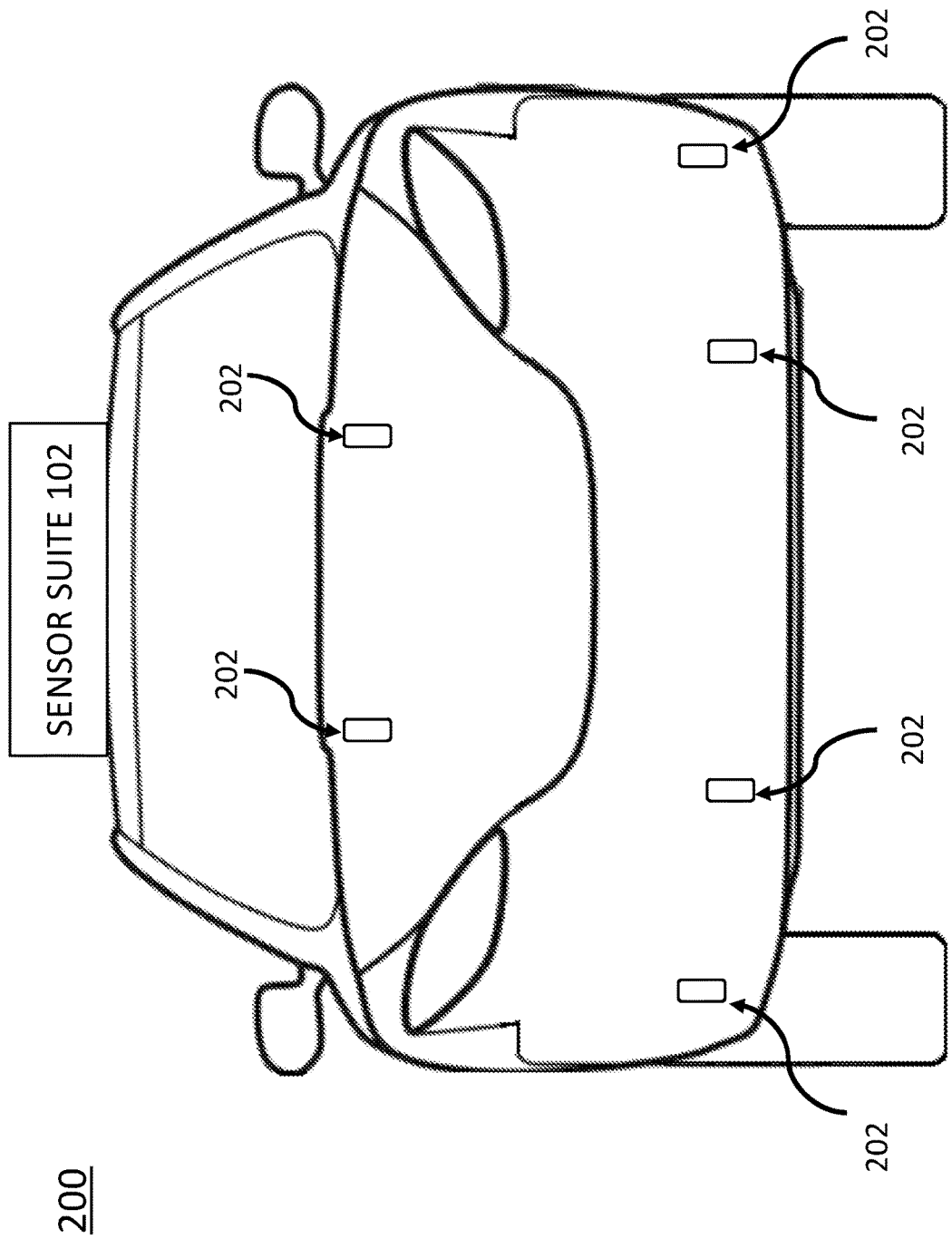
FIG. 2 is a diagram illustrating an example of a front of an autonomous vehicle having multiple transducers, according to some embodiments of the disclosure.

FIG. 2 is a diagram illustrating an example of a front of an autonomous vehicle 200 with multiple transducers 202, according to various embodiments of the invention. The transducers 202 are positioned underneath the fascia of the vehicle, such that they are not visible from the exterior. In some examples, the transducers 202 are positioned on the back side ("B-Side") of the fascia and door panels, and/or near by sheet-metal inner panels. In various implementations, more or fewer transducers 202 are included on the vehicle 200, and in various implementations, the transducers 202 are located in any selected position on or in the vehicle 200. The transducers 202 are positioned and designed to detect impacts and collisions with a surface of the autonomous vehicle 200.

According to various implementations, one or more of the transducers 202 are piezoelectric transducers. Piezoelectric transducers convert physical quantities into an electrical signal. In some examples, the piezoelectric transducers are deformation-based transducers. The deformation of the transducer is proportional to acceleration and/or strain. In some examples, the piezoelectric transducers are used to measure changes in one or more of pressure, acceleration, force, strain, and temperature via the piezoelectric effect. Piezoelectric transducers can be designed to measure changes along any axis and in some examples, the piezoelectric transducers are 3-axis transducers. In other examples, the piezoelectric transducers are 6-axis transducers. In various examples, the piezoelectric transducers can measure changes along any number of axes. Various modes of operation of the piezoelectric transducers include transverse, longitudinal, and shear. In some implementations, the piezoelectric transducers include a voltage source which changes in proportion to an applied force, pressure, or strain. In some examples, the piezoelectric transducers produce an electric voltage that can be measured to calculate the value of stress or strain applied to a material.

In some implementations, one or more of the transducers 202 are accelerometers. The accelerometers are very sensitive, and can provide impact detection information, for example by comparing sensed data from multiple transducers. In some implementations, one or more of the transducers 202 are and/or include microphones. In various implementations, one or more of the transducers 202 are permanently integrated into and/or onto the structure of the vehicle. In some examples, one or more transducers 202 are added to the autonomous vehicle 200 temporarily and/or at a later date, after the vehicle has been in service for some period of time.

According to various implementations, the transducers 202 generate information such as vibration profiles and impulse responses.

In various examples, transducers including accelerometers are positioned in multiple locations on the interior fascia of a vehicle. Accelerometer data from various locations can be combined to detect impacts. In some examples, data from an internal inertial sensor mounted to the vehicle frame (IMU) is combined with B-surface transducer 202 data to detect impacts. In particular, the inertial sensor data can be used to determine whether transducer deviations are caused by road noise, wind noise, speed bumps, and/or other non-impact-related variations. Additionally, data from multiple surface transducers 202 is compared to determine impact location. In particular, in some examples, an impact at a selected location will create the greatest deviation in transducer data from the transducers closest to the impact location, while transducers further from the impact location have a smaller deviation in transducer data, at a slightly later time, allowing for triangulation. By analyzing deviations in data at multiple transducers, the location of the impact can be determined.

In some implementations, energy captured by one or more of the transducers 202 on the back of the fascia (on the B-Side or B-Surface) is compared with energy captured by one or more other of the transducers 202. Additionally, in some implementations, energy captured by one or more of the transducers 202 on the back of the fascia is compared with the IMU data. In some examples, these comparisons are done via a coherence calculation. In some examples, the part of the spectra where the coherence approaches one is ignored, because of increased likelihood that the part of the spectra where coherence approaches one is caused by accelerations that originated with the power-train and suspension, as opposed to through impact of a B-surface transducer.

In various examples, the transducers 202 are permanently installed on the vehicle, and typical transducer responses to road features, including a spectrum of the response of each transducer, is recorded and saved. Furthermore, relationships between the transducers are recorded. In some examples, typical transducer responses including relationships between transducers from road testing and structured impact testing, are saved in a look-up table. The look-up table can be used to determine an impact location and absolute impact energy, based on variations in data from multiple transducers. In some examples, a transfer function is used to characterize a relationship between certain elements In some implementations, the transducers 202 include accelerometers that have a fine resolution and excellent DC-offset stability, allowing the transducers 202 to infer the gravity vector. Inferring the gravity vector enables confirmation that the transducer is still attached to the vehicle in its selected location. Additionally, inferring the gravity vector enables detection of towing.

In some implementations, when the autonomous vehicle is generally powered down, some modules remain awake in a low powered state. Simple threshold and deformation processing, with heuristics about the duration and intensity of the disturbance detected by the transducers 202, are used to detect vandalism, tampering and towing. When these activities are detected, a message is sent to another module to wake up the vehicle for logging of camera and audio data, as well as to wirelessly report back to a central computer.

Figure 3:
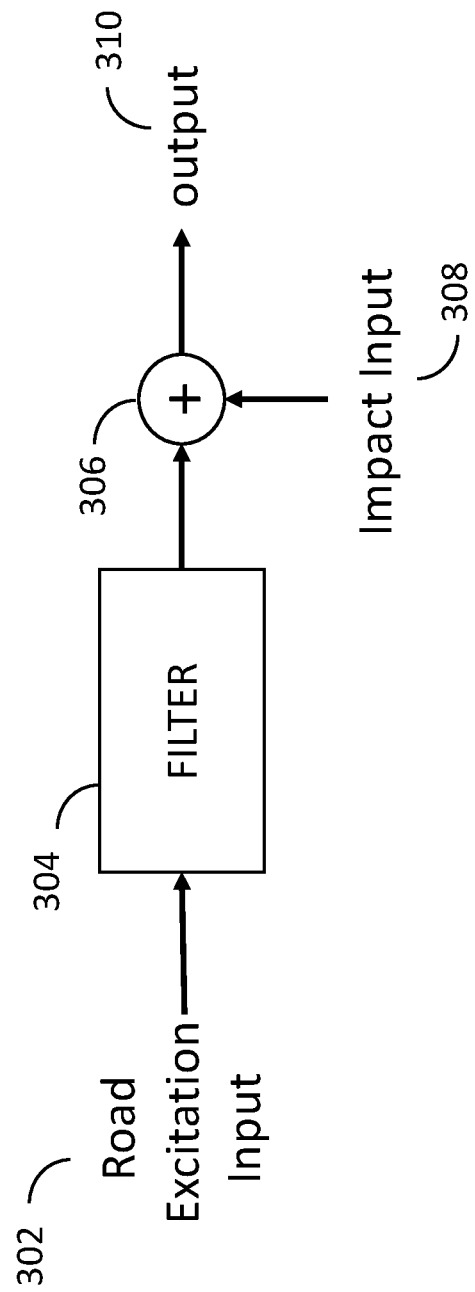
FIG. 3 is a diagram illustrating an example of transducer inputs, according to some embodiments of the disclosure.

In some implementations transducer data is combined via a coherence calculation. As shown in FIG. 3, there is a relationship between the road excitation 302 and the signal received by the transducers 202. The road excitation input 302 is characterized by a filter 304. In some examples, the filter 304 is a Linear Time Invariant Filter (LTI). In some examples, the filter 304 is a Transfer function through the suspension to the transducer. Any fascia panel or body panel impact 308 is superimposed with the filtered road excitation signal at a summer 306 and an output signal 310 indicates fascia and/or body panel acceleration at the transducer location. In some examples, the road excitation input 302 is represented as x1[n], the output of the filter 304 is represented as y1[n], the impact 308 is represented as y_impact[n], and the output 310 is represented as y[n], where y[n] =y1[n]+y_impact[n].

The road surface is not directly measured by the transducers, since, in various examples, the relationship described above holds for every transducer on the vehicle. Thus, in an example with two transducers with a body impact local to a first transducer and not a second transducer, each transducer has a different output 310.

Figure 4A:
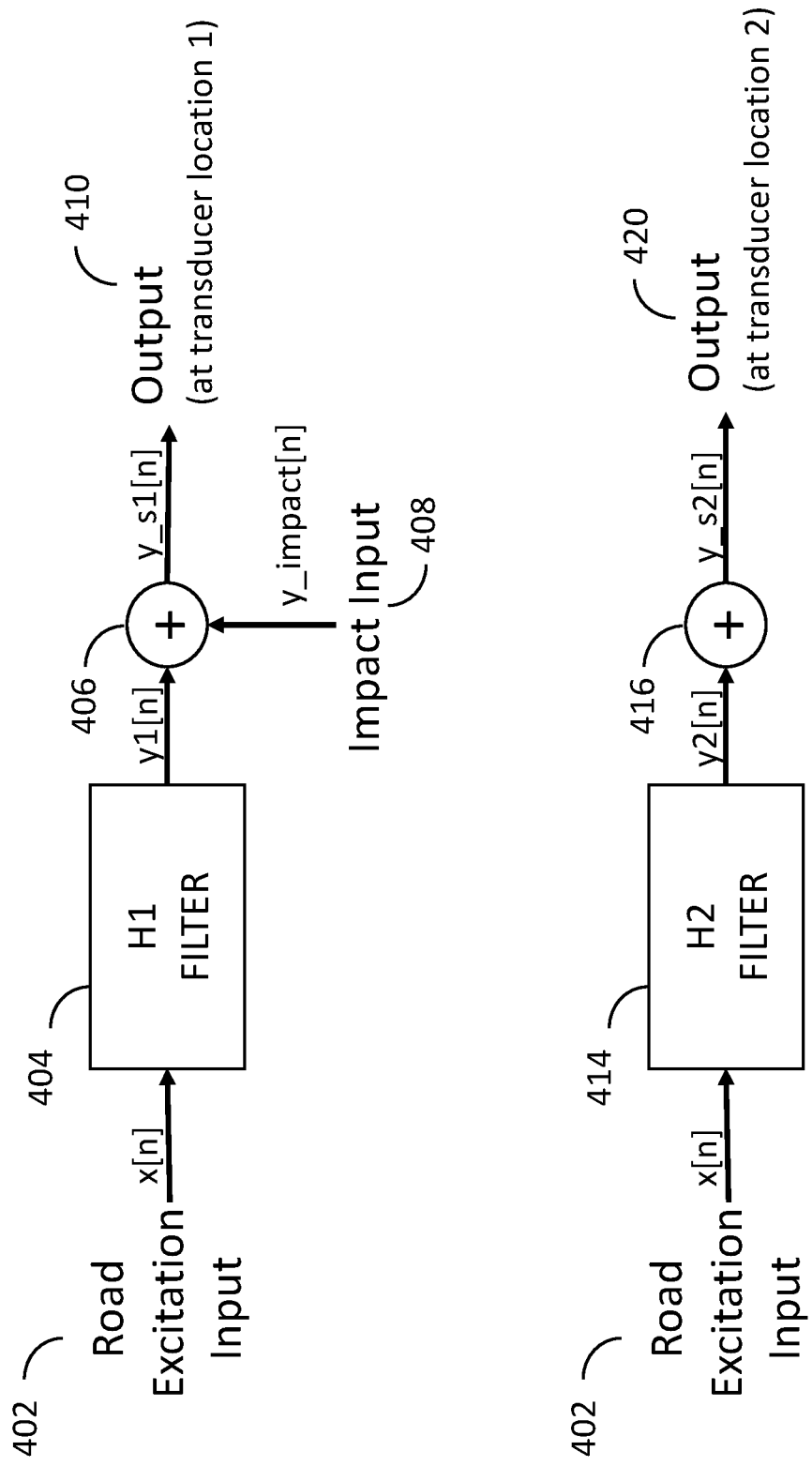
FIG. 4A is a diagram illustrating outputs from two transducers, according to some embodiments of the disclosure.

FIG. 4A shows an example of the output from each of the first and second transducers in an example including an impact at or near the first transducer, according to some embodiments of the disclosure. In particular, a first transducer receives road noise x[n] 402, which is input to a first H1 filter 404. In some examples, the first H1 filter 404 is a linear time invariant filter and includes a transfer function through the suspension to the first transducer. The output y1 [n] from the first filter 404 is input to a first summer 406, where it is added to impact input y_impact[n] 408. The output y_s1[n] from the first transducer indicates the fascia and/or body panel acceleration at the first transducer location, where y_s1[n]=y1[n]+y_impact[n]. A second transducer also receives road noise x[n] 402, which is input to a second H2 filter 414. In some examples, the second H2 filter 414 is a linear time invariant filter and includes a transfer function through the suspension to the second transducer. The output y2[n] from the second filter 414 is input to a second summer 416. When there is no impact input at the second transducer, the second filter 414 output y2[n] passes through the second summer, and the output y_s2[n] equals the y2[n]. The output y_s2[n] from the second transducer indicates the fascia and/or body panel acceleration at the second transducer location.

Figure 4B:
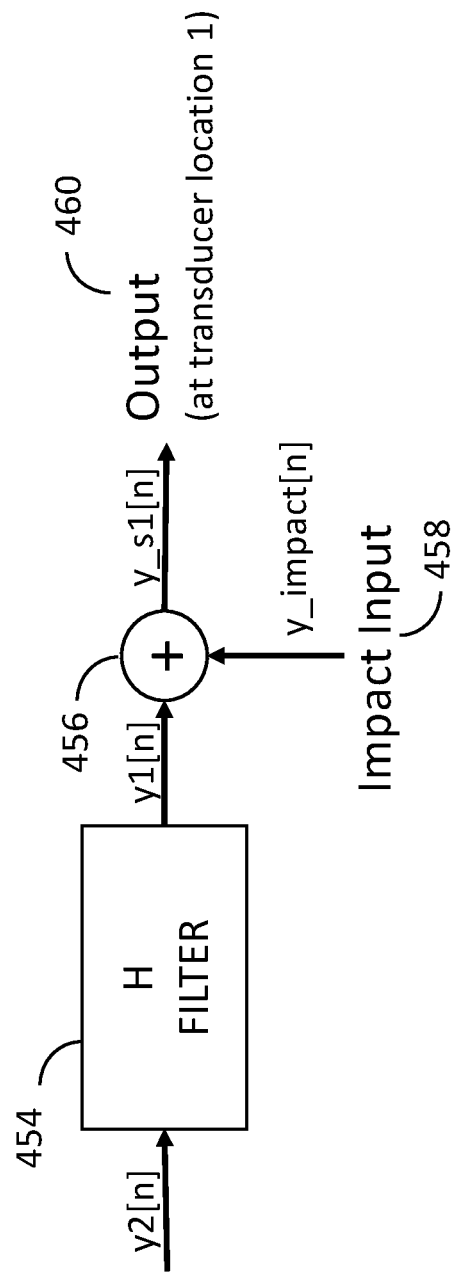
FIG. 4B is a diagram illustrating an example of transducer input signals, according to some embodiments of the disclosure.

Since y1 [n] and y2[n] are both x[n] signals after filtering, y1 [n] and y2[n] are related by a linear time invariant filter and the relationship between y1 [n] and y2[n] can be simplified as shown in FIG. 4B. FIG. 4B shows an example in which one transducer signal can effectively take the place of the rough road excitation, according to various embodiments of the disclosure. In particular, the output y2[n] from the second filter 414 becomes the input to a third filter 454, which is the filter for the first transducer. The third filter 454 is a linear time invariant filter, and includes a transfer function between the first and second transducer positions for the given road noise excitation. The output from the third filter 454 is the y1[n], and the output from the first transducer y_s1[n] remains the same as shown in FIG. 4A, with y_s1[n]=y1[n]+y_impact[n].

Figure 5:
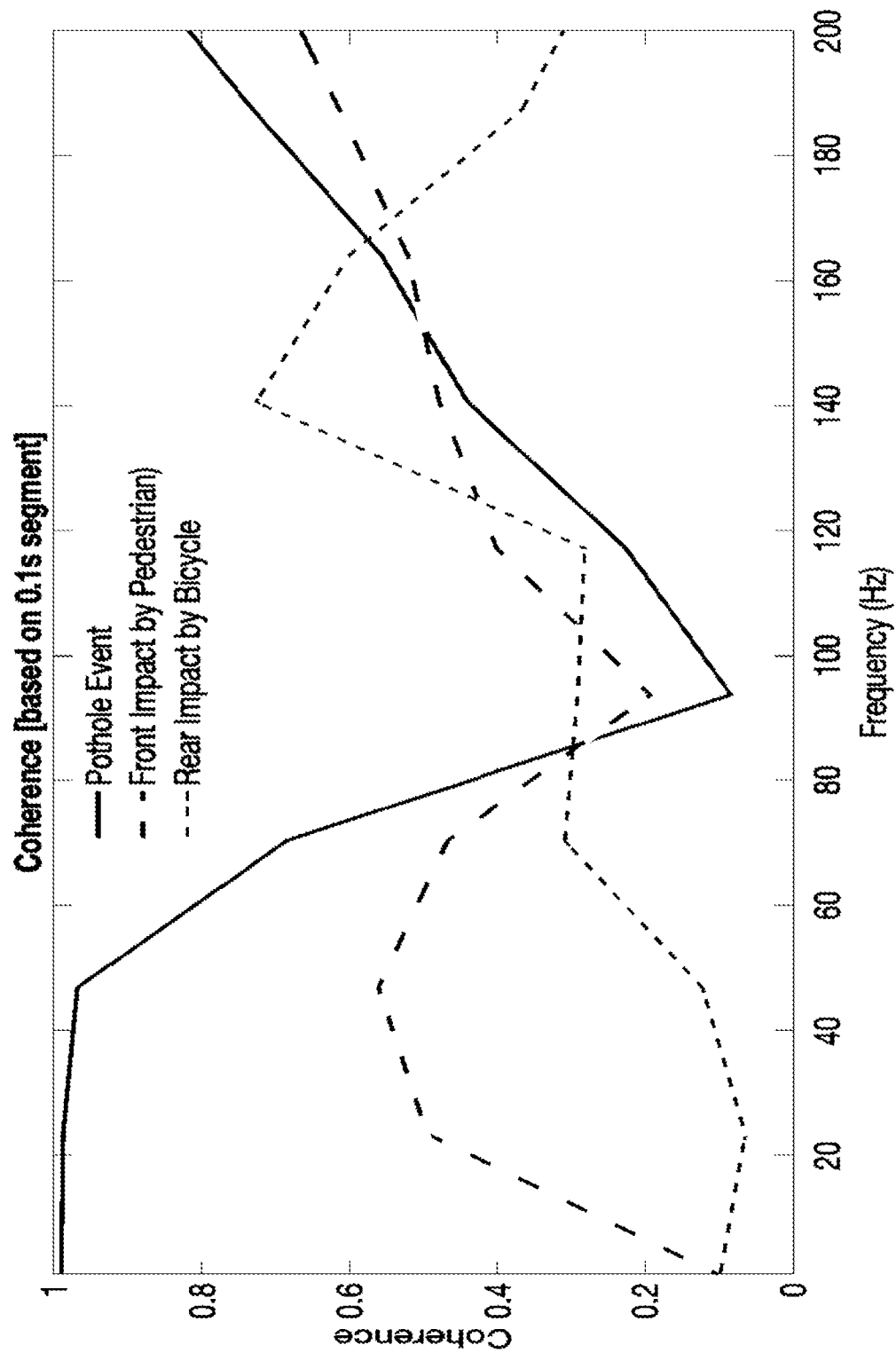
FIG. 5 is a graph illustrating coherence between transducer acceleration measurements in various examples, according to some embodiments of the disclosure.

Note that when there is no impact, y_impact[n] equals zero, and y_s1[n] is related to y2[n] by a linear time invariant (LTI) filter. Thus, when coherence between y2[n] and y_s1[n] is calculated, averaging over consecutive time windows, coherence is 1 across the portions of the spectra where the filtered road excitation dominates. For example, a pothole event measured at two transducers may exhibit a coherence between two transducer accelerations that is very close to one below 60 Hz. In one example, one transducer is a CMM transducer and the other is a TACT transducer. In contrast, as shown in FIG. 5, coherence between transducer acceleration measurements for and impact with a pedestrian and/or for an impact with a bicyclist is not as high as coherence for the pothole.

Figure 6:
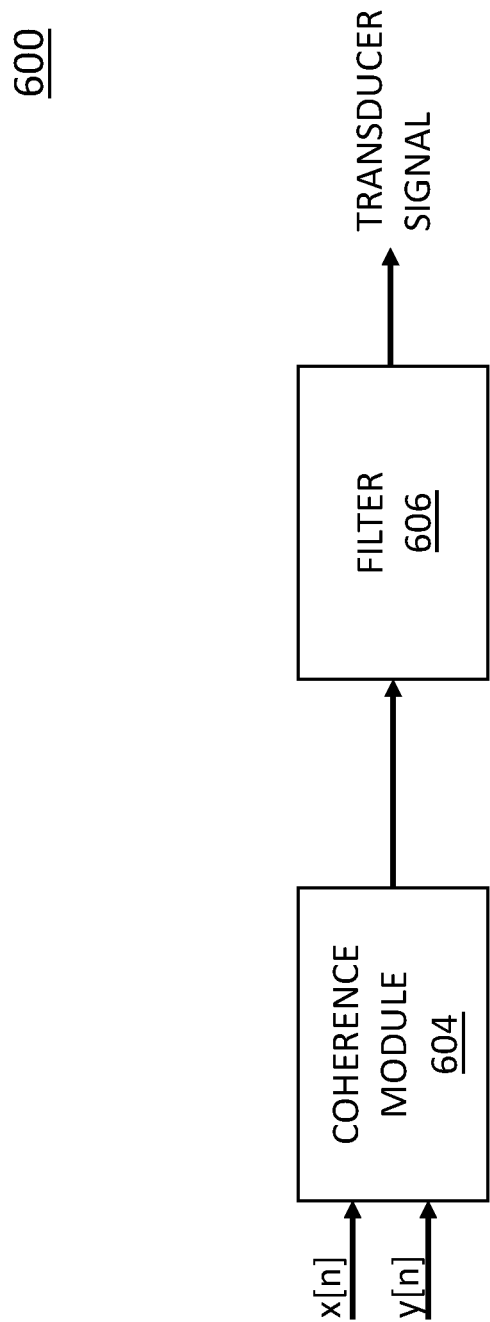
FIG. 6 shows a processing pipeline configured for rejecting accelerations caused by road excitation and driving maneuvers, according to some embodiments of the disclosure.

FIG. 6 shows a processing pipeline 600 configured for rejecting accelerations caused by road excitation and driving maneuvers, in accordance with various embodiments of the disclosure. The pipeline 600 begins with first and second inputs, where the first input x[n] is a chassis reference input and the second input y[n] is a transducer input. The first and second inputs are input to a coherence module 604. The coherence module 604 includes spectra and cross-spectra averaged over consecutive time windows. Coherence of input signals is calculated at the coherence module 604. In general:

$$\text{Coherence} = \frac{|\overline{S_{xy}(f)}|}{S_{xx}(f)S_{yy}(f)}$$

where $S_{xx}$ is the acceleration spectra of transducer x, $S_{yy}$ is the acceleration spectra of transducer y, and $S_{xy}$ is the cross spectrum.

The output of the coherence module 604 is input to a filter module 606. In some examples, the filter module 606 includes a single filter. In some examples, the filter module 606 includes a filter bank. The filter module 606 is designed to reject portions of the acceleration spectra where the coherence equals one. The output from the filter module 606 is the processing pipeline 600 output, and is a transducer signal for upstream processing that is robust to road noise such as potholes, as well as to driving maneuvers.

In some implementations, impact cases include energetic impacts with a longer than usual duration. In some examples, long duration impacts can result in a coherence of one between the transducers. However, the relative arrival time of the impact determined from the cross spectrum phase can be used to disambiguate whether the impact originated from a fascia and/or body panel, or whether the impact was due to chassis driven motion. In some implementations, impact detection false positives are reduced by tracing the arrival time of an impulse event through the vehicle chassis via cross correlation lag.

According to some implementations, impact detection false positives are reduced using the development of body dynamics models. In particular, body dynamics models can be used to relate the vehicle steering and/or acceleration and/or braking functions to vehicle fascia and/or body panel transducer signals. Expected transducer signals can be compensated for and/or removed.

According to some implementations, impact detection false positives are reduced using mapping and/or sensing potholes and/or road features associated with significant transducer signals events. Sensing potholes and/or road features can include sensing with other vehicle sensors including the sensor suite. Expected transducer signals can then be compensated for or otherwise removed.

Example Vehicle Rear with Transducers

Figure 7:
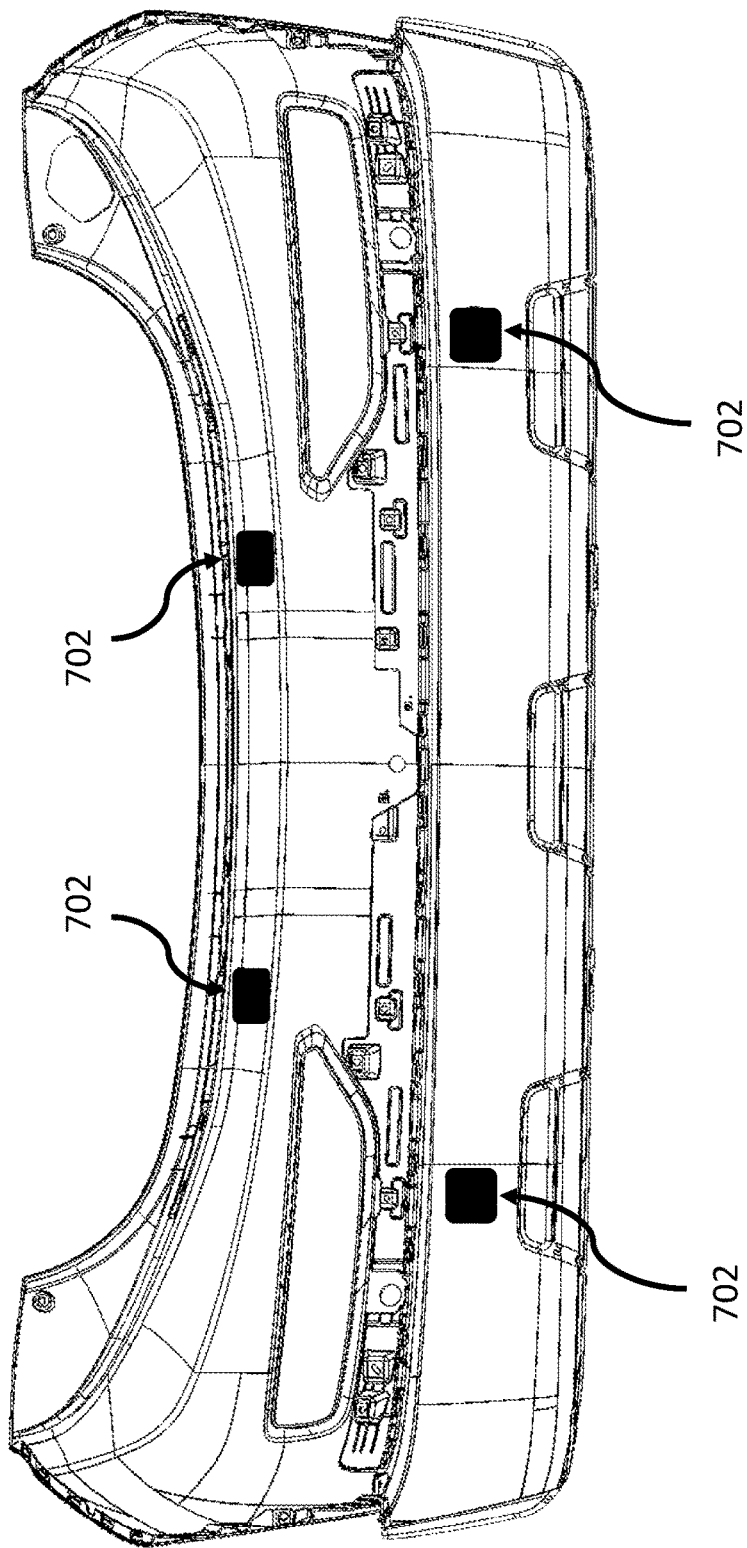
FIG. 7 is a diagram illustrating an example of a rear of an autonomous vehicle having multiple transducers, according to some embodiments of the disclosure.

FIG. 7 is a diagram illustrating an example of a rear of an autonomous vehicle 700 with multiple transducers 702, according to various embodiments of the invention. The transducers 702 are positioned underneath the fascia of the vehicle, such that they are not visible from the exterior. In various implementations, more or fewer transducers 702 are included on the vehicle 700, and in various implementations, the transducers 702 are located in any selected position on or in the vehicle 700. The transducers 702 are positioned and designed to detect contact, impacts, and collisions with a surface of the autonomous vehicle 300. As described above with respect to the transducers 202 of FIG. 2, in various examples, one or more of the transducers 702 are piezoelectric transducers, multi-axis piezoelectric transducers, accelerometers, multi-axis accelerometers, microphones.

In various implementations, additional transducers 702 are positioned along the sides of an autonomous vehicle. Also, in some examples, additional transducers 702 are positioned at the rear of the autonomous vehicle. These transducers may also be positioned underneath the fascia of the vehicle. A subset of transducers may be placed on the suspension, or the main vehicle inertial measurement unit may be used in order to determine whether the source of acceleration is the suspension, or drive train, based on time delays of correlated acceleration waveforms.

Responses among the various transducers 702 are used to detect impacts and collisions with the vehicle, at least in part by detecting deviations from typical patterns. Additionally, the data from the transducers 702 can be combined with data from the transducers 202 of FIG. 2 as well as with data from transducers on the sides, rear, interior, frame, and other locations on the vehicle, to generate response patterns and detect anomalies and/or deviations.

Example System for Impact Detection

Figure 8:
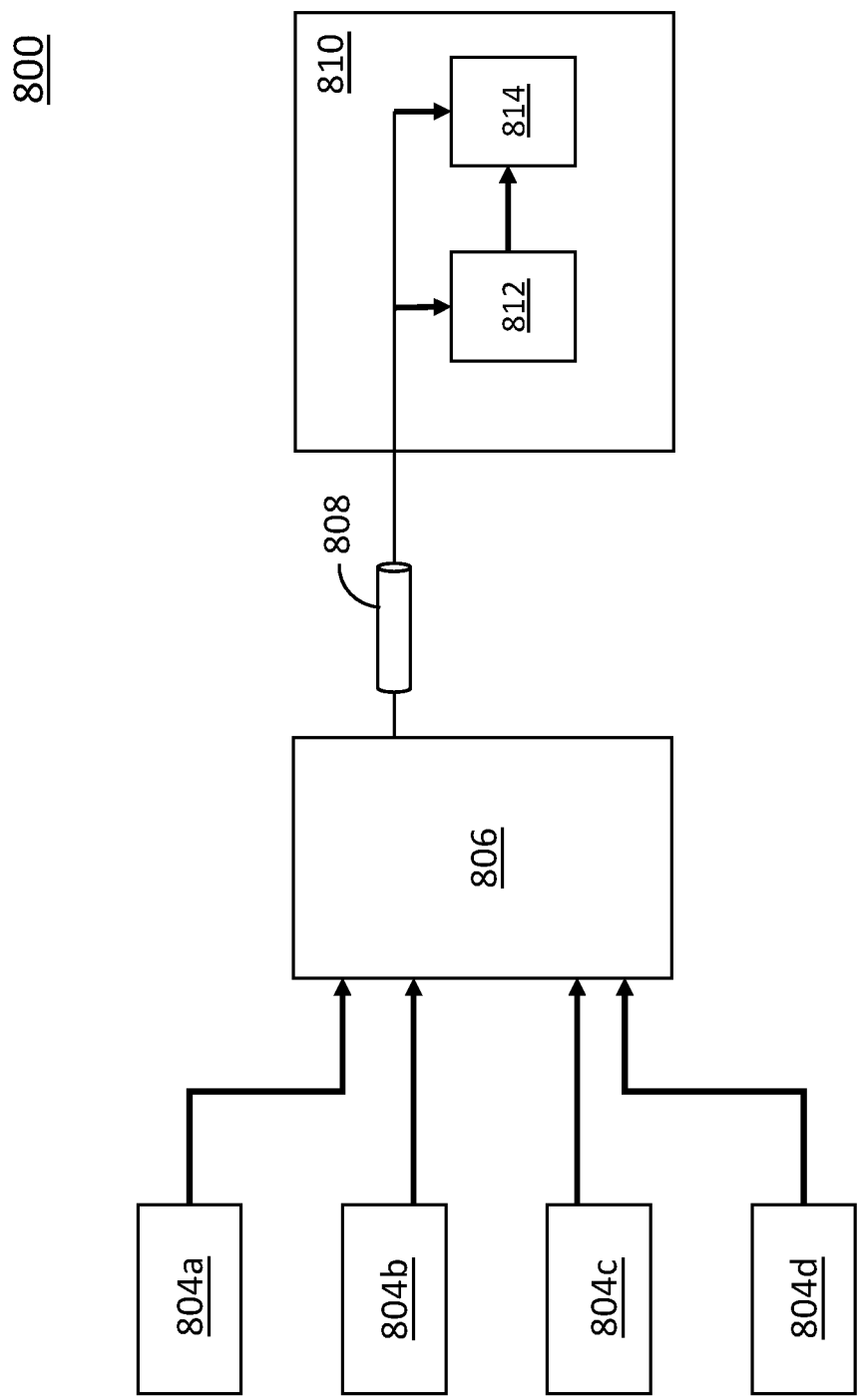
FIG. 8 is a diagram of a system for detecting impacts and collisions, including multiple transducers, a data acquisition module, and a processing module, according to some embodiments of the disclosure.

FIG. 8 is a diagram 800 of a system for detecting impacts and collisions, including multiple transducers 804a-804d, a data acquisition module 806, and a processing module 810, according to various embodiments of the disclosure. The transducers 804a-804d generate transducer data as described above with respect to FIGS. 2 and 7. Each of the transducers 804a-804d are connected on a bus, and transducer data is transmitted to a data acquisition module 806. In various implementations, a bus includes more than four transducers. The transducer data is generated as analog or digital data in the sensor, and in some examples, the analog transducer data is converted to a digital signal at an analog-to-digital converter on the bus. A transceiver transmits the data from the bus to the data acquisition module.

The transducer 804a-804d data is received at the data acquisition module 406, which collects the data from multiple transducers 804a-804d, and from multiple busses. In some examples, the data acquisition module 806 filters the transducer data. In some examples, the data acquisition module performs pre-processing filtering on the transducer data. In one example, the data acquisition module 806 is a FPGA-based (field programmable gate array-based) module and includes one or more filters for filtering the received transducer data. In some implementations, the data acquisition module 806 determines whether deviations and outliers in 804a-804d transducer data are caused by a vandalism event. In some examples, vandalism occurs when the vehicle is stationary. In some implementations, the data acquisition module 806 determines whether deviations and outliers in transducer 804a-804d data are caused by the vehicle being towed.

The data acquisition module 806 is connected to a processor 810 via a connection 808. In some examples, the connection 808 is one of an ethernet connection, an optical cable connection, and a wireless connection. The processor 810 receives the filtered transducer data from the data acquisition module 806, as well as data from a vehicle sensor suite, such as the sensor suite 102 in FIG. 1, vehicle odometer data, and ISM communication data. The processor 810 includes a signal processing module 812 and an impact detection module 814, and using the various input data, the processor 810 determines whether an impact is detected. The processor 810 performs signal processing on the filtered data at a signal processing module 812, as described below with respect to FIG. 9. In some examples, the processor 810 performs digital signal processing on the filtered data. Additionally, the processor 810 includes an impact detection module 814, as described below with respect to FIG. 10. The impact detection module 814 receives the filtered transducer data from the acquisition module 806. In some examples, impact detection module 814 receives raw data. In some examples, the impact detection module 814 receives filtered data, and in particular data with noise filtered out, as described below with respect to FIG. 9. In some examples, the impact detection module 814 also receives the processed data from the signal processing module 812.

In some examples, the transducer data includes a spectrum of data that can be divided into multiple bands, and a transfer function can be used to evaluate each of the bands. In one example, the spectrum is divided into twelve octave bands, and a twelve octave band transfer function is used to evaluate the transducer data and detect impacts.

Example Processor for Impact Detection

Figure 9:
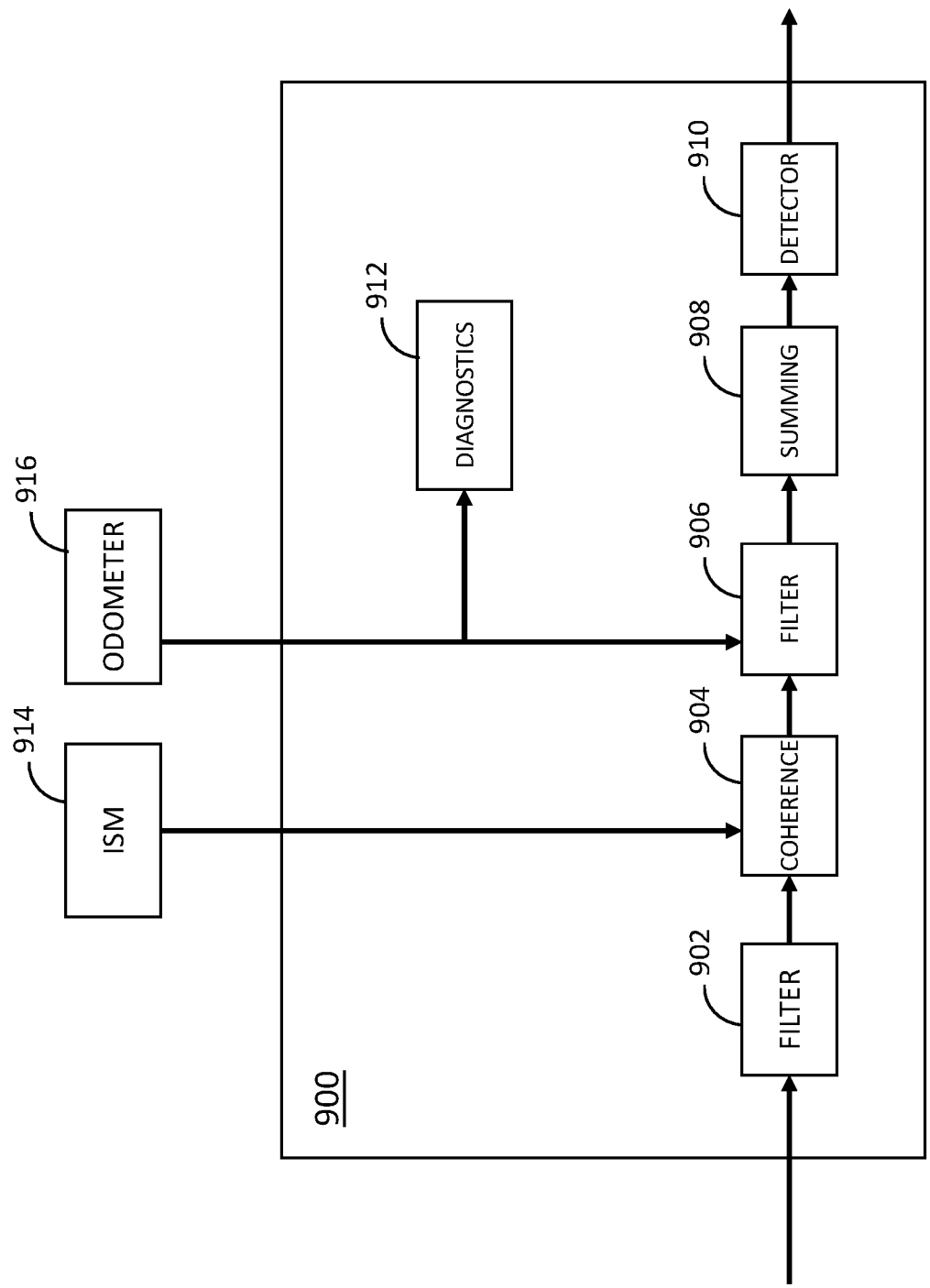
FIG. 9 shows a signal processing module for processing transducer data on a vehicle, according to some embodiments of the disclosure.

FIG. 9 shows a signal processing module 900 for processing transducer data on a vehicle, according to various embodiments of the disclosure. The signal processing module 900 receives transducer data collected at a data acquisition module, such as the data acquisition module 806 of FIG. 8. In some examples, the signal processing module 900 input is a digital signal. Additionally, the signal processing module 900 receives ISM/CMM (Inertial Sensing Module/Chassis Motion Module) data from an ISM module 914 and odometer data from the vehicle odometer 916. The signal processing module 900 includes a low pass filter 902, a coherence calculation module 904, a noise filter 906, a summing module 908, and a detector 910. Additionally, the signal processing module 900 includes a diagnostics module 912, which received odometer 916 data and calculates a gravity vector when the vehicle is stationary. In some examples, the diagnostics module 912 performs a root mean squared (RMS) calculation.

The digital signal input to the signal processing module 900 is filtered at the filter 902. In some implementations, the filter 902 is a low pass filter. In some examples, the low pass filter filters out frequencies above about 800 Hz. In some examples, the low pass filter filters out frequencies above about 500 Hz. In some implementations, the filter 902 is a band pass filter. In some examples, the band pass filter filters out frequencies around that of the vehicle suspension. In some examples, the band pass filter filters out frequencies around 2 kHz. The filtered signal from the filter 502 is then input to the coherence calculation module 904, which performs a coherence calculation to remove chassis-driven motion from the signal. The coherence calculation module 904 also receives ISM/CMM input data.

In some examples, coherence equations are used to split the transducer data spectrum into categories. In particular, coherence equations can be used to split the transducer data spectrum into a portion that includes chassis-driven data and a portion that includes wind or other noise-driven data. The output from the coherence calculation module 904 is input to a noise filter 906 which also receives odometer data from the odometer 916, and removes noise such as wind noise and/or road noise from the signal.

The processed signal from the noise filter 906 is input to the processing summing 908, which performs a Pythagorean sum for each tri-axis. In some examples, the Pythagorean sum includes total energy across all axes. In some examples, the Pythagorean sum includes energy that is normal to the surface of the vehicle, since the energy normal to the surface is generally more likely to be caused by an impact rather than wind noise, road noise, a speed bump, and/or other types of noise. The output from the summing module 908 is input to a detector 910, which performs threshold-based detection. In particular, the detector 910 determines whether the input exceeds one or more selected thresholds and indicates a vehicle impact. The detector 910 output is the signal processing module 900 output, and is input to an impact detection module, such as the impact detection module 814 of FIG. 8.

Example Impact Detection Module

Figure 10:
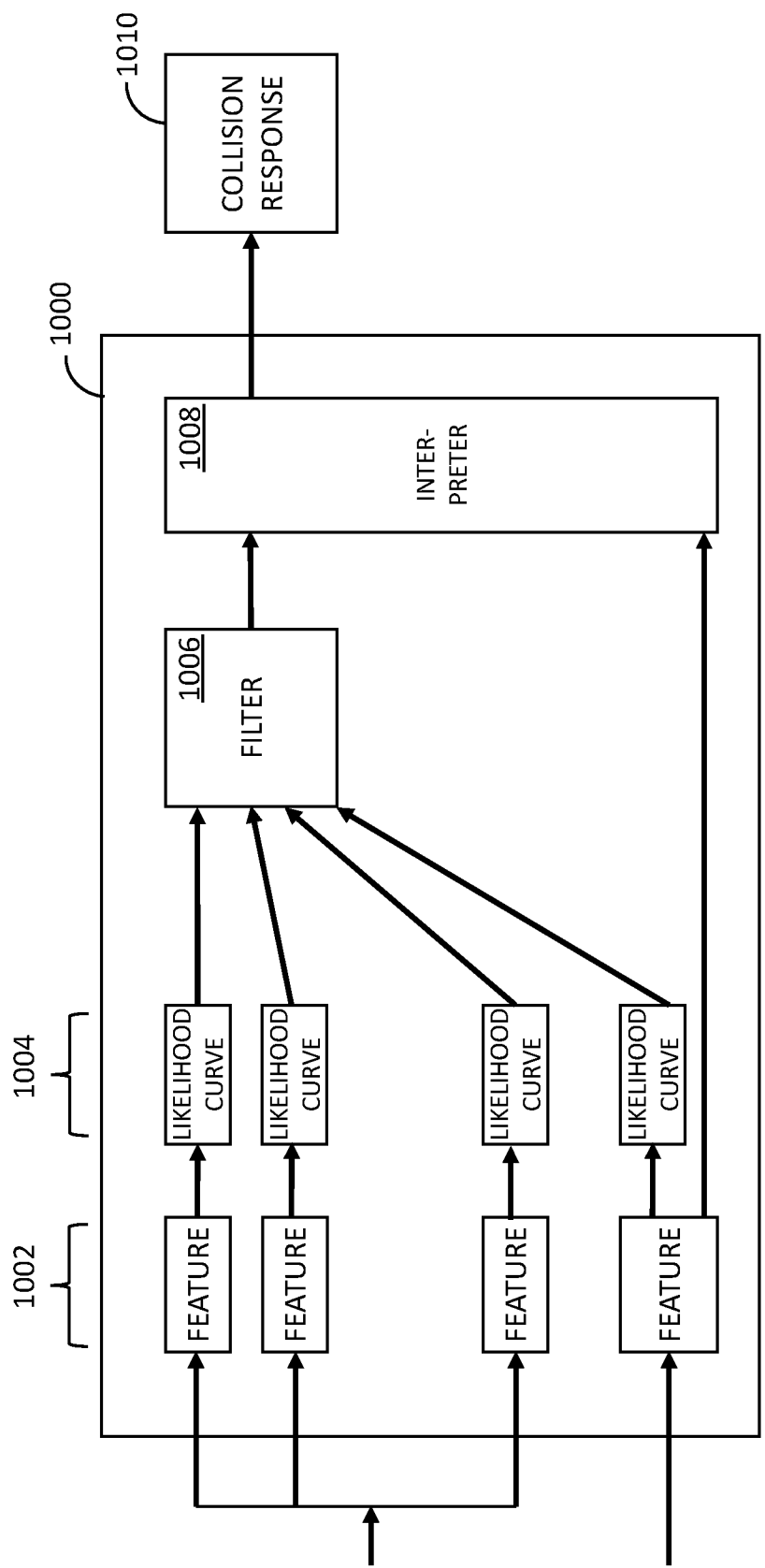
FIG. 10 shows impact detection module for detecting impacts to a vehicle, according to some embodiments of the disclosure.

FIG. 10 shows impact detection module 1000 for detecting impacts to a vehicle, according to various embodiments of the disclosure. The impact detection module 1000 receives transducer data collected at a data acquisition module, such as the data acquisition module 806 of FIG. 8. Additionally, the impact detection module 1000 receives data from an inertial measurement unit. In some examples, the inertial measurement unit is an accelerometer positioned on a center of mass of the rigid body of the vehicle. In some examples, the impact detection unit 1000 also receives input from various other vehicle sensors, including, for example, LIDAR data, camera data, radar data, ultrasonics data, odometer data, and ISM/CMM data.

The impact detection module 1000 uses a filter 1006 to process the received data. The filter 1006 uses a sensor fusion algorithm to fuse multiple inputs. In particular, the input is used to compute a set of features 1002. The features derived from vehicle sensor data are characterized with respect to the likelihood of a collision given the particular value of the feature. In some implementations, the features 1002 are input to a set of likelihood curve modules 1004. In some examples, the likelihood curve modules determine the likelihood of a collision according to the current trajectory of the data. In some examples, for one or more features, the likelihood calculation is based on an assumption that no action is taken and no deviation occurs from the current trajectory. The data from the likelihood curve modules 1004 is combined at the filter 1006. In one example, the filter 1006 includes a binary bayes fusion model adapted for multiple features. The filter 1006 generates a confidence that a collision is currently occurring. In some examples, a threshold is placed at a specific confidence to delineate collisions from non-collisions. The filter 1006 output is input to a control module 1008, which interprets the filter 1006 output and determines whether to activate a downstream collision response protocol 1010.

Example Method for Impact Detection

Figure 11:
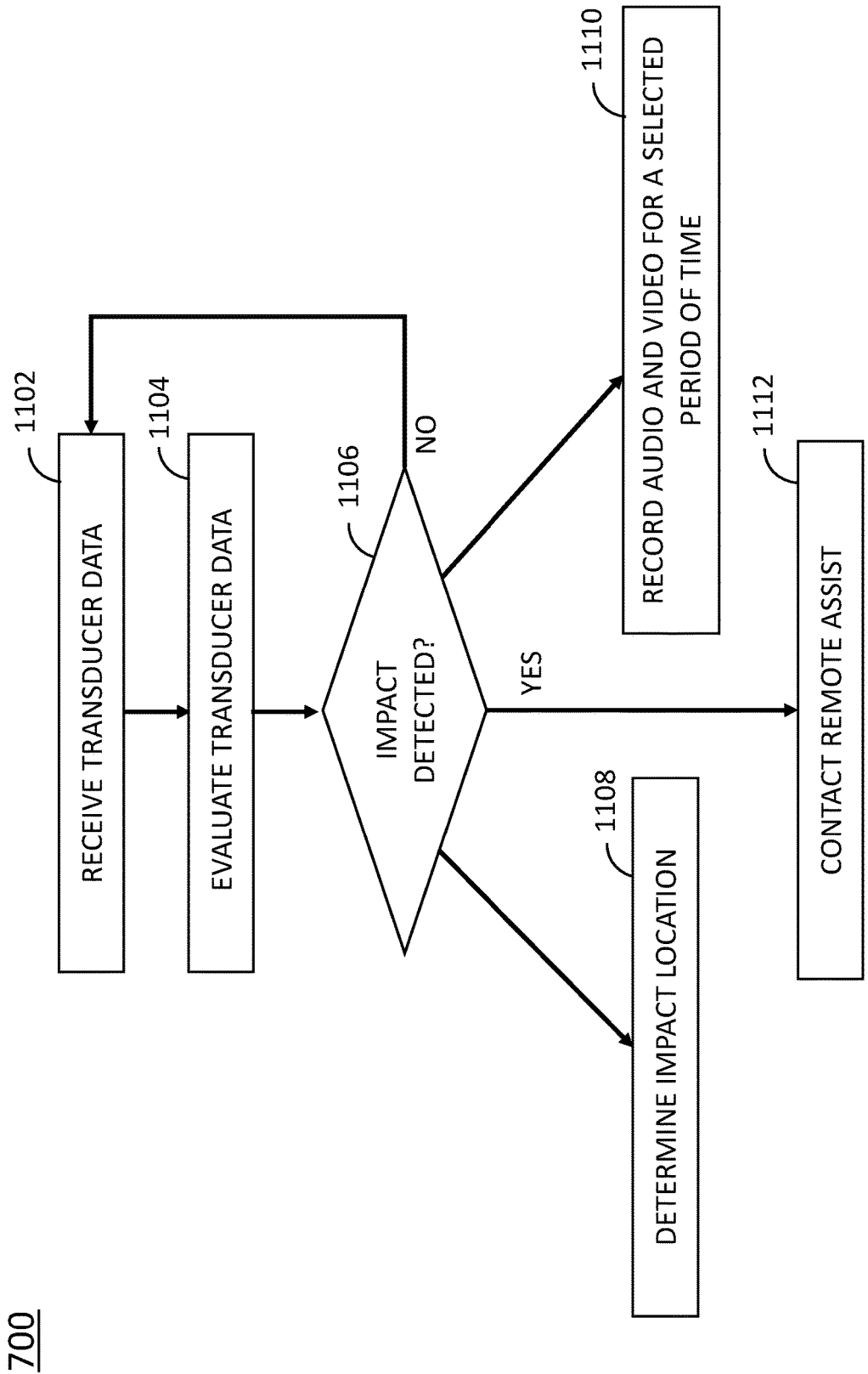
FIG. 11 shows a method 700 for monitoring the detecting impacts to a vehicle, according to some embodiments of the disclosure.

FIG. 11 shows a method 1100 for monitoring the detecting impacts to a vehicle, according to various embodiments of the disclosure. At step 1102, transducer data is received at a bus. The transducer data is analog data and it can be converted to a digital signal at an analog-to-digital converter on the bus. A transceiver can be used to transmit the transducer data to a data acquisition module. In various examples, the data acquisition module receives data from multiple transducers. The data acquisition module combines the transducer data from multiple transducers and, in some examples, performs filtering functions on the transducer data. In some examples, the data acquisition module pre-processes the transducer data. In some examples, the data acquisition module filters out transducer data deviations caused by vandalism. In other examples, the data acquisition module filters out transducer data deviations caused by the vehicle being towed.

The data acquisition module transmits the transducer data to a computing system, such as the onboard computer 104 in the autonomous vehicle of FIG. 1. The computing system includes a processor, and, at step 1104, the processor processes the transducer data. In various examples, the processor also receives data from a sensor suite, such as the sensor suite 102 of FIG. 1. The processor includes a signal processing module and an impact detection module. The signal processing module filters the transducer data, reducing noise in the data, such as wind noise, road noise and chassis noise. The processor also receives odometer data from a main inertial sensor which can contribute to information about expected wind noise. The impact detection module receives the transducer data and the filtered data from the signal processing module and determines whether a collision occurred. In some examples, the impact detection module determines the likelihood that a collision has occurred. In some examples, the impact detection module determines the likelihood that a collision will occur.

At step 1106, the processor determines if an impact is detected. In some examples, the new transducer data is compared to typical transducer data to detect outliers and/or deviations. In some examples, the new transducer data is compared to previous transducer data to detect outliers and/or deviations. If no impact is detected at step 1106, the method returns to step 1102. In some examples, the transducers are permanently installed in the vehicle, and transducer data is regularly evaluated. In some implementations, transducer data is collected to identify transducer data patterns.

If, at step 1106, an impact is detected, the onboard computer initiates an impact detection protocol. The impact detection protocol includes, at step 1108, determining the location of the impact. In some examples, the location of the impact is determined based data from each of a plurality of transducers and a look-up table that indicates expected transducer data for each of the transducers based on an impact at a specified location. The impact detection protocol further includes, at step 1110, recording (and saving) audio and video for a selected period of time surrounding the impact. In some examples, audio and video recordings for a selected period of time before and after the impact are saved. In various examples, the selected period of time is 30 seconds, one minute, or more than one minute. The impact detection protocol further includes, at step 1112, contacting remote assist. Remote assist includes a human operator who can evaluate sensor data from the vehicle, including audio and video data, and determine the type of impact event and the severity of the impact event. In some examples, the human operator can contact emergency services. In some examples, following a detected impact, the vehicle is routed to a service center for evaluation of damage caused by the impact and, potentially, for repair of any damage. In some examples, following a detected impact, the vehicle is towed to a service center for repair.

Example of Autonomous Vehicle Fleet

Figure 12:
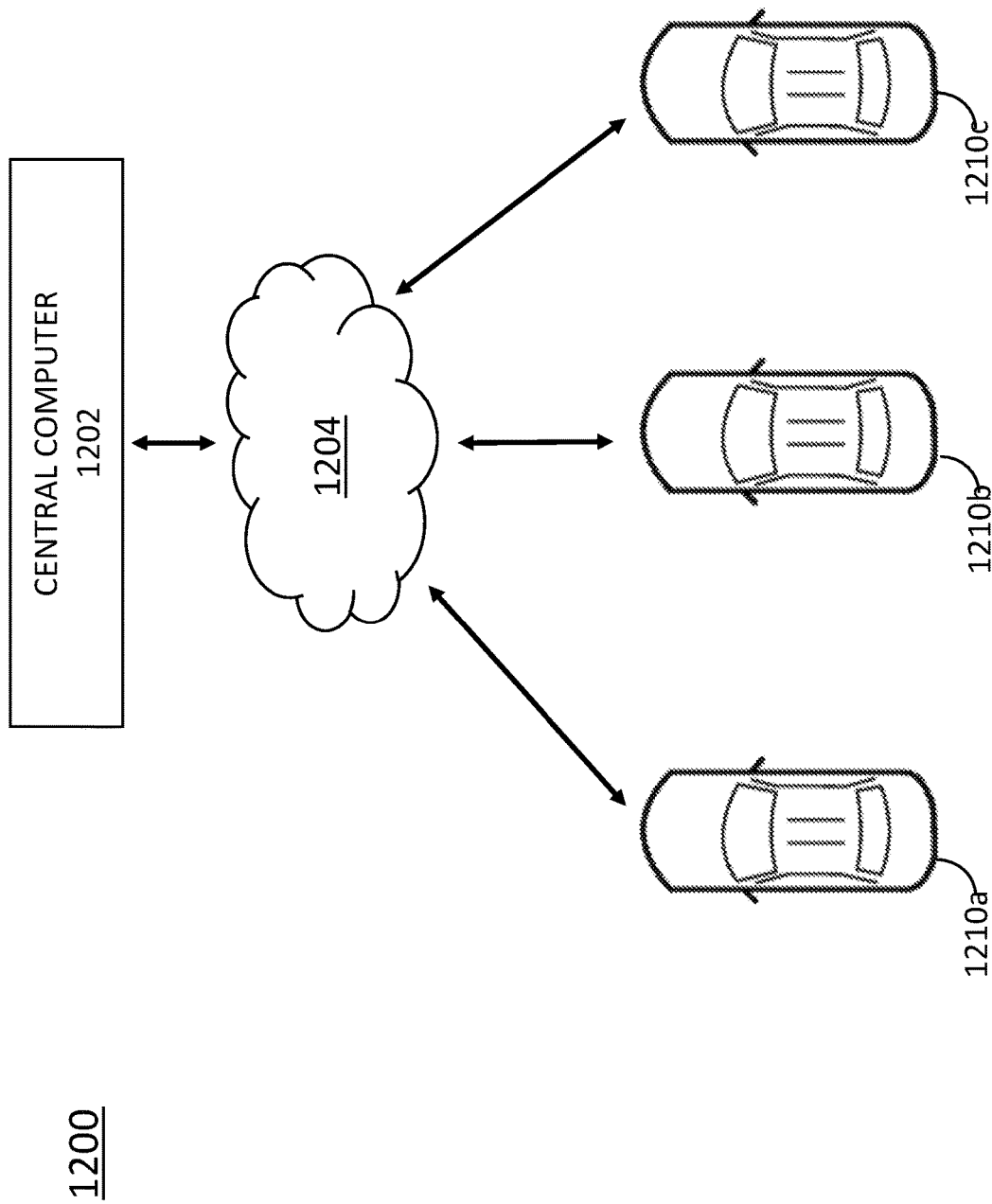
FIG. 12 is a diagram illustrating a fleet of autonomous vehicles in communication with a central computer, according to some embodiments of the disclosure.

FIG. 12 is a diagram illustrating a fleet of autonomous vehicles 1210a-1210c in communication with a central computer 1202, according to some embodiments of the disclosure. As shown in FIG. 12, the vehicles 1210a-1210c communicate wirelessly with a cloud 1204 and a central computer 1202. The central computer 1202 includes a routing coordinator and a database of information from the vehicles 1210a-1210c in the fleet. Autonomous vehicle fleet routing refers to the routing of multiple vehicles in a fleet. In some implementations, autonomous vehicles communicate directly with each other. The vehicles 1210a-1210c include impact detection systems. In various examples, when the impact detection systems in one or more of the vehicles 1210a-1210c flags an outlier, the information is communicated with the central computer 1202.

When a ride request is received from a passenger, the routing coordinator selects an autonomous vehicle 1210a-1210c to fulfill the ride request, and generates a route for the autonomous vehicle 1210a-1210c. The generated route includes a route from the autonomous vehicle's present location to the pick-up location, and a route from the pick-up location to the final destination.

Each vehicle 1210a-1210c in the fleet of vehicles communicates with a routing coordinator. In some examples, the vehicles 1210a-1210c send information to the routing coordinator such impact detection data. In various examples, impact detection data includes the locations of the occurrence of impact events. In some examples, the routing coordinator flags certain locations as having a high likelihood of an impact event. In particular, information gathered by various autonomous vehicles 1210a-1210c in the fleet can be communicated with the routing coordinator, where it is saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more travelling preferences and/or routing goals. Data can also be used to avoid various road hazards, such as pot holes and speed bumps, as well as areas with high likelihood of an impact event.

According to various implementations, a set of parameters can be established that determine which metrics are considered (and to what extent) in determining routes or route modifications. Generally, a routing goal refers to, but is not limited to, one or more desired attributes of a routing plan indicated by at least one of an administrator of a routing server and a user of the autonomous vehicle. The desired attributes may relate to a desired duration of a route plan, a comfort level of the route plan, a vehicle type for a route plan, and the like. For example, a routing goal may include time of an individual trip for an individual autonomous vehicle to be minimized, subject to other constraints. As another example, a routing goal may be that comfort of an individual trip for an autonomous vehicle be enhanced or maximized, subject to other constraints. In another example, a routing goal includes minimizing power expenditure and conserving charge on the HV battery of the vehicle.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridesharing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, passenger safety, pedestrian safety, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, rideshare revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals take priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick-up location and destination location, and an onboard computer on the selected autonomous vehicle generates a route and navigates to the destination and/or any intermediate stop.

In some implementations, each vehicle 1210a-1210c provides an indication of the state of charge of the vehicle's battery to the central computing system 1202. The central computing system 1202 may include one or more battery data databases to store state of charge for each vehicle 1210a-1210c. The battery data databases may be communicatively coupled to the central computing system 1202 and the battery data databases may be stored on one or more servers and/or other memory devices. The battery data databases may store data related to charging and/or discharging of batteries, such as charging curves of the batteries and/or discharging curves of the batteries.

In various implementations, the central computing system 1202 determines power requirements for various routes, and state of charge of the battery in each vehicle 1210a-1210c is considered in selecting a vehicle to fulfill a route request. Furthermore, the central computing system 1202 can predict when a vehicle 1210a-1210c state of charge will reach a low level, and determine when the vehicle 1210a-1210c will be routed to a charging center.

The central computing system 1202 and routing coordinator may further include data regarding battery maintenance activities during routing assignments. The data regarding battery maintenance activities may include allowable charging frequency for the routing assignments (i.e., how often a battery may be charged during the assignments, which may be indicated as the minimum amount of time between which a vehicle can return to a charging station for charging of the battery), allowable charge-times (i.e., the maximum amount of time that a vehicle can remain at a charging station for a charge cycle of the battery before returning to routing assignments), amount of time the vehicle is to be on the road during the routing assignments, rates of charging available, or some combination thereof. The data regarding battery maintenance activity may be utilized by the central computing system 1202 to determine manage battery levels of the fleet of vehicles.

In some implementations, the central computing system 1202 stores additional battery-related information for each vehicle in the battery databases. For example, the battery databases may include data regarding, battery age for batteries in each of the vehicles, cost of battery replacement for each of the batteries, effects on hardware of each of the vehicles, hardware arrangements of the vehicles (such as sensors of the vehicles, control systems of the vehicles, and/or software implemented on the vehicles), or some combination thereof. The central computing system 1202 may utilize the vehicle-specific information to determine vehicle-specific current draw from the battery and/or the cost of replacing the battery.

The central computing system 1202 battery database may further include data related to environmental factors for the routing assignments, since environmental factors can affect power usage. The data related to the environmental factors may include environmental data (such as temperature, wind, and/or rain) and route data (such as grades of the terrain) for the routing assignments. In some embodiments, the battery databases may further include data indicating the effects of the environmental factors on current draw and/or charging due to regenerative braking for the routing assignments. The central computing system 1202 utilizes the data related to the environmental factors to compensate for changes in the amount of charge used for the routing assignments and/or the current draw on the batteries of the vehicles when assigned to the routing assignments.

In some implementations, the central computing system 1202 receives indications of battery states for the batteries of the vehicles in the fleet. The central computing system 1202 can generate or update one or more state-of-charge profiles for each of the batteries based on a determined degradation level and the data from the battery databases. Each state-of-charge profile of the state-of-charge profiles may include an upper bound value that indicates a maximum optimal charge for the battery and a lower bound value that indicates a minimum optimal charge for the battery. Each state of charge profile also includes a low threshold state of charge for triggering an automatic shut down event.

In some implementations, the central computing system 1202 flags a detected impact for a vehicle and sends instructions to the vehicle to drive to a service center for repair.

In some implementations, the central computing system 1202 determines characteristics for the routing assignments. For example, the characteristics may include the predicted amounts of energy for the routing assignments, the anticipated charging frequency for each vehicle, the charge-times for each vehicle, the amount of time each vehicle will be on the road, and/or the rate of charging available. Based on the characteristics, the central computing system 1202 selects vehicles from the available vehicles that satisfy the characteristics of the routing assignments.

Example of a Computing System for Ride Requests

Figure 13:
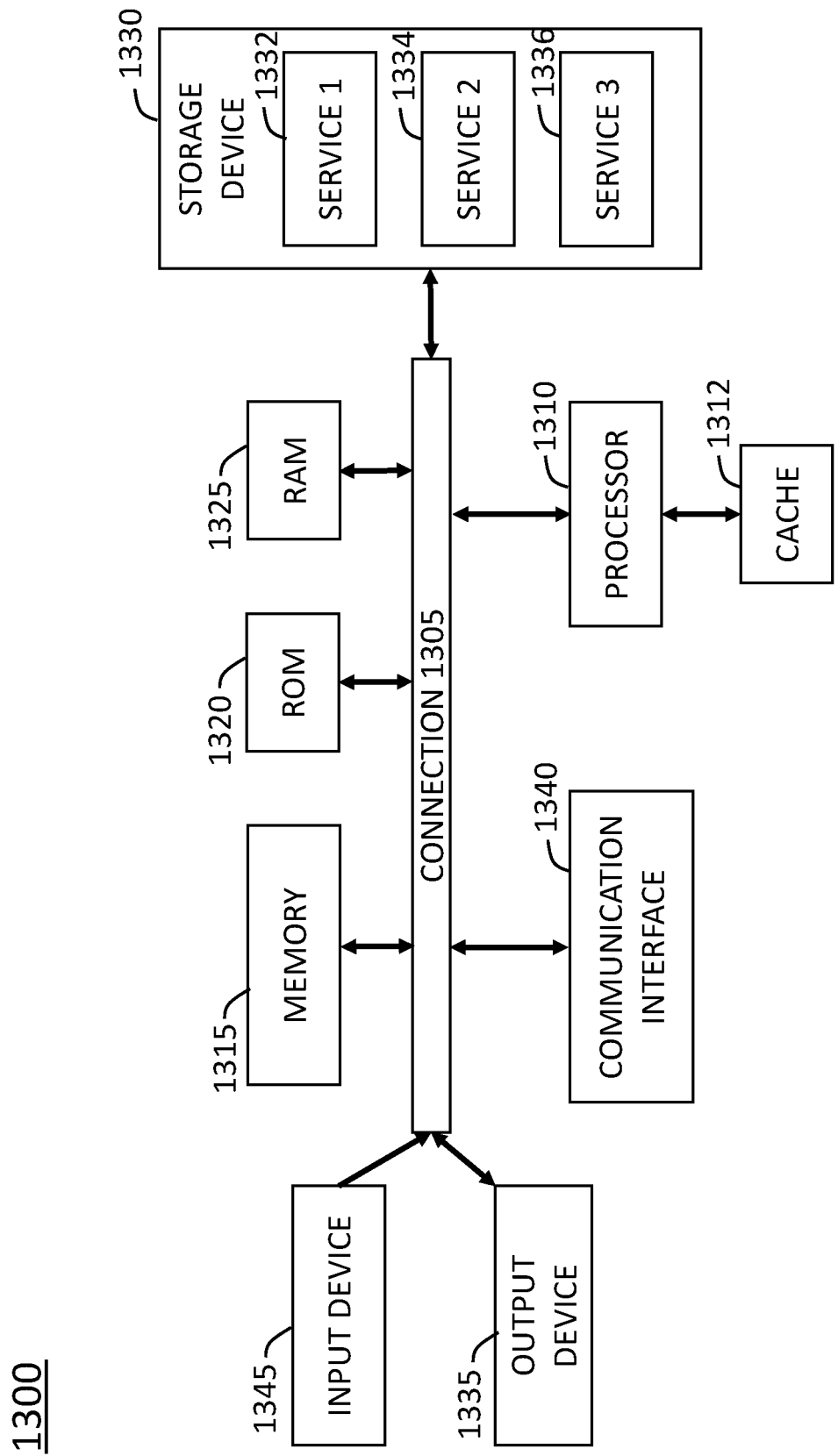
FIG. 13 shows an example embodiment of a system for implementing certain aspects of the present technology.

FIG. 13 shows an example embodiment of a computing system 1300 for implementing certain aspects of the present technology. In various examples, the computing system 1300 can be any computing device making up the onboard computer 104, the central computing system 1202, or any other computing system described herein. The computing system 1300 can include any component of a computing system described herein which the components of the system are in communication with each other using connection 1305. The connection 1305 can be a physical connection via a bus, or a direct connection into processor 1310, such as in a chipset architecture. The connection 1305 can also be a virtual connection, networked connection, or logical connection.

In some implementations, the computing system 1300 is a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

The example system 1300 includes at least one processing unit (CPU or processor) 1310 and a connection 1305 that couples various system components including system memory 1315, such as read-only memory (ROM) 1320 and random access memory (RAM) 1325 to processor 1310. The computing system 1300 can include a cache of high-speed memory 1312 connected directly with, in close proximity to, or integrated as part of the processor 1310.

The processor 1310 can include any general-purpose processor and a hardware service or software service, such as services 1332, 1334, and 1336 stored in storage device 1330, configured to control the processor 1310 as well as a special-purpose processor where software instructions are incorporated into the actual processor design. The processor 1310 may essentially be a completely self-contained computing system, containing multiple cores or processors, a bus, memory controller, cache, etc. A multi-core processor may be symmetric or asymmetric.

To enable user interaction, the computing system 1300 includes an input device 1345, which can represent any number of input mechanisms, such as a microphone for speech, a touch-sensitive screen for gesture or graphical input, keyboard, mouse, motion input, speech, etc. The computing system 1300 can also include an output device 1335, which can be one or more of a number of output mechanisms known to those of skill in the art. In some instances, multimodal systems can enable a user to provide multiple types of input/output to communicate with the computing system 1300. The computing system 1300 can include a communications interface 1340, which can generally govern and manage the user input and system output. There is no restriction on operating on any particular hardware arrangement, and therefore the basic features here may easily be substituted for improved hardware or firmware arrangements as they are developed.

A storage device 1330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as a processor 1310, a connection 1305, an output device 1335, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a system for monitoring detecting an impact on a vehicle, comprising a plurality of transducers positioned on an interior side of a vehicle surface configured to generate transducer data, a data acquisition module configured to receive the transducer data from the plurality of transducers and generate combined transducer data, and a signal processor configured to process the combined transducer data and identify outlier data.

Example 2 provides a system according to one or more of the preceding and/or following examples, further comprising an impact detection module configured to receive the combined transducer data and the outlier data, and further configured to detect the impact on the vehicle based, at least in part, on the combined transducer data and the outlier data.

Example 3 provides a system according to one or more of the preceding and/or following examples, further comprising a sensor suite coupled to the vehicle, wherein the impact detection module is further configured to receive sensor suite data and detect the impact on the vehicle based, at least in part, on the sensor suite data.

Example 4 provides a system according to one or more of the preceding and/or following examples, further comprising an inertial sensor configured to detect vehicle movement, wherein the signal processor is further configured to process inertial sensor data to identify the outlier data.

Example 5 provides a system according to one or more of the preceding and/or following examples, wherein at least one of the plurality of transducers is a piezoelectric transducer.

Example 6 provides a system according to one or more of the preceding and/or following examples, wherein at least one of the plurality of transducers is positioned underneath a vehicle fascia, and wherein the at least one transducer captures changes at the vehicle fascia.

Example 7 provides a system according to one or more of the preceding and/or following examples, wherein the plurality of transducers are configured to continuously generate transducer data.

Example 8 provides an autonomous vehicle having an impact detection system, comprising a plurality of transducers positioned on an interior side of a vehicle surface configured to generate transducer data, and an onboard computing system configured to receive the transducer data from the plurality of transducers, comprising a data acquisition module configured to generate combined transducer data, and a signal processor configured to process the combined transducer data and identify outlier data.

Example 9 provides an autonomous vehicle according to one or more of the preceding and/or following examples, wherein the onboard computing system further comprises an impact detection module configured to receive the combined transducer data and the outlier data, and further configured to make an impact detection determination based, at least in part, on the combined transducer data and the outlier data.

Example 10 provides an autonomous vehicle according to one or more of the preceding and/or following examples, wherein the impact detection module is configured to determine a likelihood of impact, and wherein the impact detection determination is based, at least in part, on the likelihood determination.

Example 11 provides an autonomous vehicle according to one or more of the preceding and/or following examples, further comprising a sensor suite coupled to the vehicle, wherein onboard computer is further configured to receive sensor suite data, and wherein the impact detection module makes the impact detection determination based, at least in part, on the sensor suite data.

Example 12 provides an autonomous vehicle according to one or more of the preceding and/or following examples, further comprising an inertial sensor configured to detect vehicle movement, wherein the onboard computer is further configured to receive inertial sensor data, and wherein the signal processor is further configured to process the inertial sensor data to identify the outlier data.

Example 13 provides an autonomous vehicle according to one or more of the preceding and/or following examples, wherein at least one of the plurality of transducers is a piezoelectric transducer.

Example 14 provides an autonomous vehicle according to one or more of the preceding and/or following examples, wherein at least one of the plurality of transducers is positioned underneath a vehicle fascia, and wherein the at least one transducer captures changes at the vehicle fascia.

Example 15 provides a method for detecting impacts to a vehicle, comprising: receiving transducer data from a plurality of transducers on a vehicle fascia; filtering the transducer data to reduce noise; evaluating the transducer data to detect impacts; and initiating an impact detection protocol, upon impact detection.

Example 16 provides a method according to one or more of the preceding and/or following examples, further comprising identifying transducer data patterns and detecting an outlier in the transducer data patterns.

Example 17 provides a method according to one or more of the preceding and/or following examples, further comprising receiving data from an inertial sensor, and wherein evaluating includes using the inertial sensor data in combination with the transducer data to detect impacts.

Example 18 provides a method according to one or more of the preceding and/or following examples, wherein initiating an impact detection protocol includes at least one of: determining impact location, recording audio and video data, and contacting remote assist.

Example 19 provides a method according to one or more of the preceding and/or following examples, wherein evaluating the transducer data includes determining a likelihood of impact.

Example 20 provides a method according to one or more of the preceding and/or following examples, further comprising comparing the transducer data to a look-up table to determine location of a detected impact.

Variations and Implementations

According to various examples, driving behavior includes any information relating to how an autonomous vehicle drives. For example, driving behavior includes how and when the autonomous vehicle actuates its brakes and its accelerator, and how it steers. In particular, the autonomous vehicle is given a set of instructions (e.g., a route or plan), and the driving behavior determines how the set of instructions is implemented to drive the car to and from various destinations, and, potentially, to stop for passengers or items. Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes). Additionally, driving behavior includes information relating to whether the autonomous vehicle drives and/or parks.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A system for detecting an impact on a vehicle, comprising:
    a plurality of transducers positioned on an interior side of a vehicle surface configured to generate transducer data;
    a data acquisition module configured to receive the transducer data from the plurality of transducers and generate combined transducer data;
    a signal processor configured to process the combined transducer data and identify outlier data;
    a sensor suite coupled to the vehicle to generate sensor suite data, wherein the sensor suite data includes inertial measurement unit (IMU) data; and
    an impact detection module to receive the combined transducer data, the outlier data, and the sensor suite data, and to detect the impact on the vehicle based, at least in part, on the combined transducer data, the outlier data, and the sensor suite data, wherein the impact detection module is to compare the IMU data with the combined transducer data to determine a coherence measurement, and to detect the impact on the vehicle based, at least in part, on the coherence measurement.

2. The system of claim 1, wherein the sensor suite is positioned on top of the vehicle and includes localization and driving sensors.

3. The system of claim 1, further comprising an inertial sensor configured to detect vehicle movement, wherein the signal processor is further configured to process inertial sensor data to identify the outlier data.

4. The system of claim 1, wherein at least one of the plurality of transducers is a piezoelectric transducer.

5. The system of claim 1, wherein at least one of the plurality of transducers is positioned underneath a vehicle fascia, and wherein the at least one transducer captures changes at the vehicle fascia.

6. The system of claim 1 wherein the plurality of transducers is configured to continuously generate transducer data.

7. An autonomous vehicle having an impact detection system, comprising:
    a plurality of transducers positioned on an interior side of a vehicle surface configured to generate transducer data;
    a sensor suite coupled to the vehicle to generate sensor suite data, wherein the sensor suite data includes inertial measurement unit (IMU) data,; and
    an onboard computing system configured to receive the transducer data from the plurality of transducers and to receive the sensor suite data, comprising:

a data acquisition module configured to generate combined transducer data;

a signal processor configured to process the combined transducer data and identify outlier data; and an impact detection module to receive the combined transducer data and the outlier data, to compare the IMU data with the combined transducer data to determine a coherence measurement, and to make an impact detection determination based, at least in part, on the combined transducer data, the sensor suite data, the outlier data, and the coherence measurement.

8. The autonomous vehicle of claim 7, wherein the sensor suite is positioned on top of the vehicle and includes localization and driving sensors.

9. The autonomous vehicle of claim 7, wherein at least one of the plurality of transducers is positioned underneath a vehicle fascia, and wherein the at least one transducer captures changes at the vehicle fascia.

10. The autonomous vehicle of claim 7, wherein the impact detection module is configured to determine a likelihood of impact, and wherein the impact detection determination is based, at least in part, on the likelihood determination.

11. The autonomous vehicle of claim 7, further comprising an inertial sensor configured to detect vehicle movement, wherein the onboard computer is further configured to receive inertial sensor data, and wherein the signal processor is further configured to process the inertial sensor data to identify the outlier data.

12. The autonomous vehicle of claim 7, wherein at least one of the plurality of transducers is a piezoelectric transducer.

13. A method for detecting impacts to a vehicle, comprising:

receiving transducer data from a plurality of transducers on a vehicle fascia;

filtering the transducer data to reduce noise;

receiving sensor suite data from a sensor suite, including receiving inertial sensor data from an inertial sensor;

evaluating the transducer data and the sensor suite data to detect impacts, wherein evaluating includes comparing the inertial sensor data with the transducer data to determine a coherence measurement, and detecting impacts on the vehicle based, at least in part, on the coherence measurement; and initiating an impact detection protocol, upon impact detection.

14. The method of claim 13, wherein initiating an impact detection protocol includes at least one of: determining impact location, recording audio and video data, and contacting remote assist.

15. The method of claim 13, wherein evaluating the transducer data includes determining a likelihood of impact.

16. The method of claim 13, further comprising comparing the transducer data to a look-up table to determine location of a detected impact.

17. The method of claim 13, wherein the sensor suite is positioned on top of the vehicle and includes localization and driving sensors.

18. The method of claim 13, further comprising identifying transducer data patterns and detecting an outlier in the transducer data patterns.

19. The method of claim 18, wherein evaluating includes evaluating the outlier, the transducer data, and the sensor suite data to detect impacts.

* * * * *